(12) United States Patent
Chernyak et al.

(10) Patent No.: US 10,721,321 B2
(45) Date of Patent: Jul. 21, 2020

(54) DATA MAINTENANCE USING PIPELINE

(71) Applicant: Microsoft Technology Licensing, LLC, Redmond, WA (US)

(72) Inventors: Michael Chernyak, Los Gatos, CA (US); Diego Buthay, San Francisco, CA (US); Tianshi Zhu, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1229 days.

(21) Appl. No.: 14/927,192

(22) Filed: Oct. 29, 2015

(65) Prior Publication Data

US 2017/0124137 A1   May 4, 2017

(51) Int. Cl.
*G06F 17/00* (2019.01)
*H04L 29/08* (2006.01)
*G06F 11/14* (2006.01)

(52) U.S. Cl.
CPC .......... *H04L 67/2842* (2013.01); *G06F 11/14* (2013.01); *H04L 67/10* (2013.01); *G06F 11/1443* (2013.01)

(58) Field of Classification Search
CPC ...... H04L 67/2842; H04L 67/10; G06F 11/14; G06F 11/1443
See application file for complete search history.

(56) References Cited

U.S. PATENT DOCUMENTS

| | | | | |
|---|---|---|---|---|
| 5,987,432 A | * | 11/1999 | Zusman | G06Q 40/00 705/35 |
| 2011/0179050 A1 | * | 7/2011 | Parsons | G06Q 40/00 707/755 |
| 2015/0348166 A1 | * | 12/2015 | Trivedi | G06Q 30/0631 705/26.7 |

* cited by examiner

*Primary Examiner* — Tyler J Torgrimson
(74) *Attorney, Agent, or Firm* — Schwegman Lundberg & Woessner, P.A.

(57) ABSTRACT

In some embodiments, a method comprises: receiving update data from a data source, the update data being part of a data feed from the data source; in response to receiving the update data from the data source, storing the update data in a data buffer; transmitting the update data from the data buffer to a data transformer, the data transformer being configured to transform the update data and to transmit the transformed update data to an online service, the update data being continued to be stored in the data buffer subsequent to the transmitting of the update data to the data transformer; receiving a request for retransmission of the update data from the data buffer to the data transformer, and in response to the request for retransmission, retransmitting the update data from the data buffer to the data transformer.

14 Claims, 10 Drawing Sheets

DATA MAINTENANCE USING PIPELINE

TECHNICAL FIELD

The present application relates generally to data processing systems and, in one specific example, to methods and systems of data maintenance using a pipeline.

BACKGROUND

Data feeds are used to provide updated data from data sources to destination systems that process the updated data. Problems can arise in the destination systems, causing certain updated data to be missed or corrupted.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
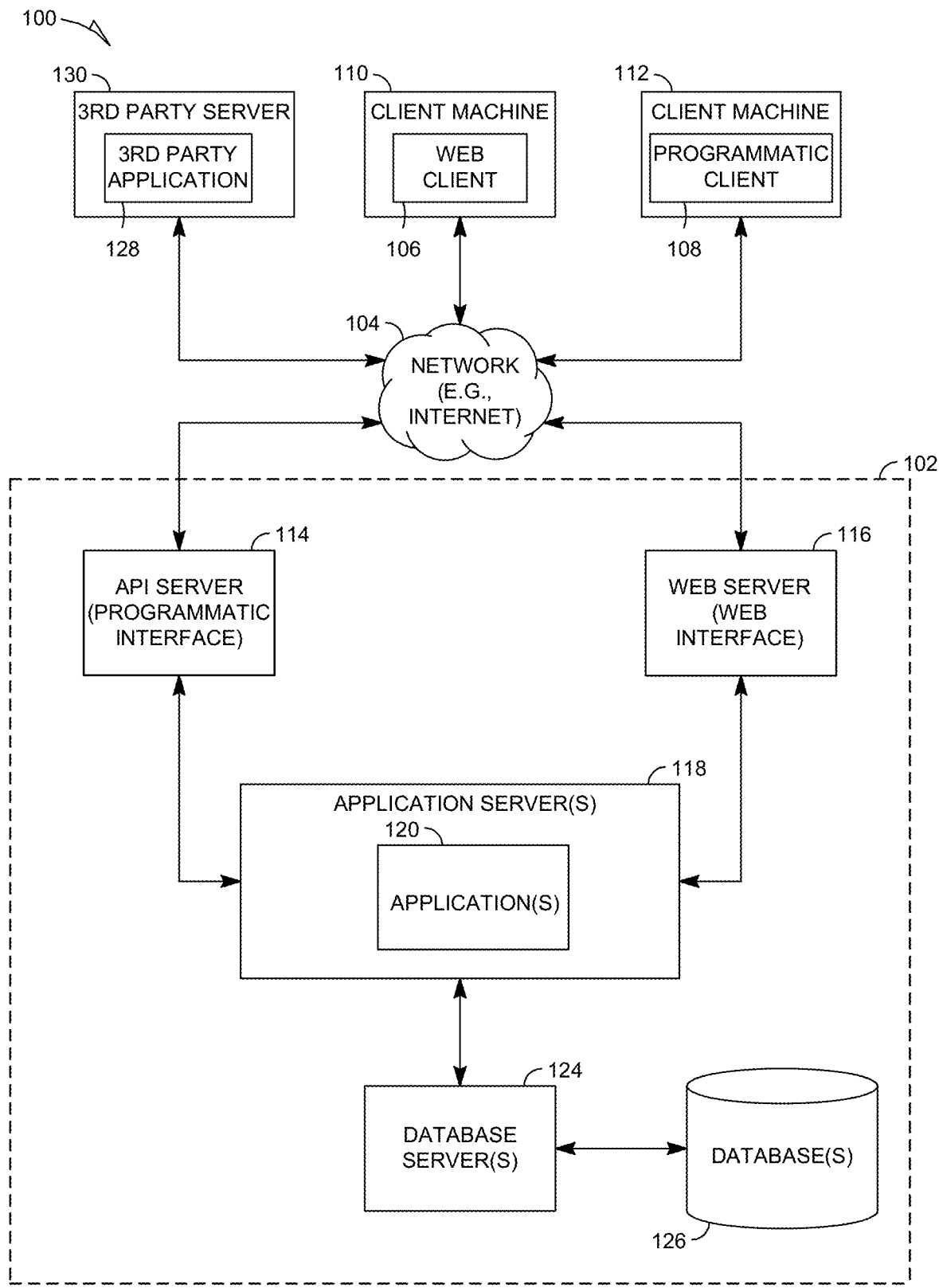
FIG. 1 is a block diagram illustrating a client-server system, in accordance with an example embodiment.

Example methods and systems of data maintenance using a pipeline are disclosed. In the following description, for purposes of explanation, numerous specific details are set forth in order to provide a thorough understanding of example embodiments. It will be evident, however, to one skilled in the art that the present embodiments may be practiced without these specific details.

The present disclosure introduces techniques of maintaining update data using a pipeline and enabling retransmission of the update. In some example embodiments, operations are performed by at least one processor, with the operations comprising: receiving update data from a data source, the update data being part of a data feed from the data source; in response to receiving the update data from the data source, storing the update data in a data buffer; transmitting the update data from the data buffer to a data transformer, the data transformer being configured to transform the update data and to transmit the transformed update data to an online service, the update data being continued to be stored in the data buffer subsequent to the transmitting of the update data to the data transformer; receiving a request for retransmission of the update data from the data buffer to the data transformer; and in response to the request for retransmission, retransmitting the update data from the data buffer to the data transformer.

In some example embodiments, the data buffer comprises a first-in first-out (FIFO) buffer. In some example embodiments, the online service comprises a social networking service.

In some example embodiments, the operations further comprise storing time data in the data buffer in association with the update data, the time data identifying a time at which the update data was received. In some example embodiments, the request for retransmission comprises a time indication, and retransmitting the update data comprises identifying the update data in the data buffer using the time indication of the request for retransmission.

In some example embodiments, the operations further comprise storing at least one of source data and type data in the data buffer in association with the update data, with the source data identifying the data source, and the type data identifying a type of the update data.

In some example embodiments, the operations further comprise: detecting a problem associated with the data transformer, and generating the request for retransmission of the update data based on the detecting of the problem.

In some example embodiments, the operation further comprise: detecting a problem associated with the data transformer; generating a notification of the problem based on the detecting of the problem; causing the generated notification of the problem to be displayed to a user on a computing device; receiving, from the user on the computing device, an indication to request retransmission of the update data; and generating the request for retransmission of the update data based on the received indication to request retransmission of the update data. In some example embodiments, the indication to request retransmission of the update data is received via at least one selectable user interface elements displayed to the user on the computing device in association with the generated notification. In some example embodiments, the indication comprises at least one parameter from a group of parameters consisting of a time indication, a data source indication, and a data type indication, and retransmitting the update data comprises identifying the update data in the data buffer based on the at least one parameter.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, the any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
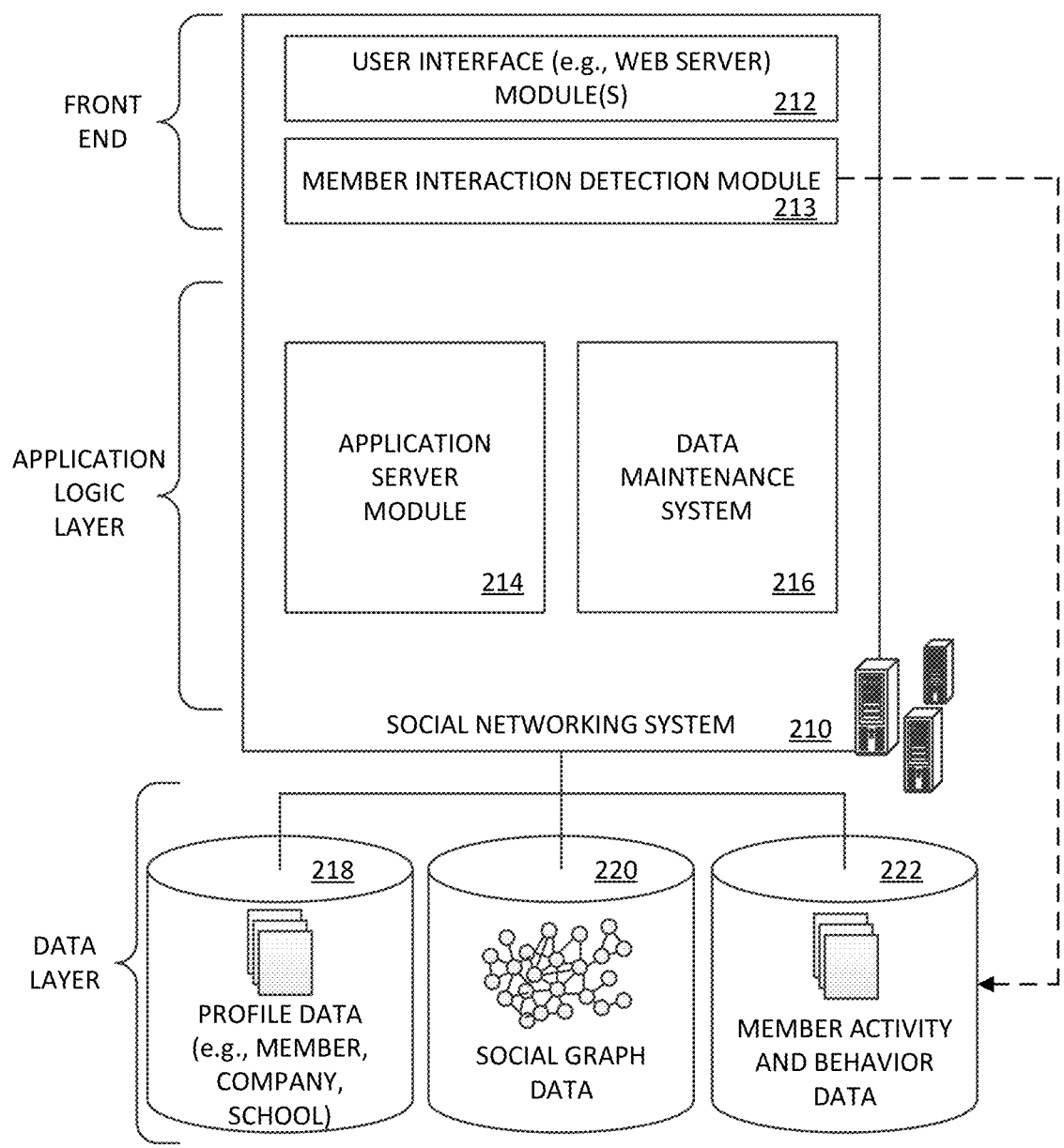
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a data maintenance system 216, for use in social networking system 210, consistent with some embodiments of the present disclosure. In some embodiments, some or all of the components of the data maintenance system 216 reside on application server 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction and detection module 213 may be provided to detect various interactions that members have with different applications, services and content presented. As shown in FIG. 2, upon detecting a particular interaction, the detection module 213 logs the interaction, including the type of interaction and any meta-data relating to the interaction, in the activity and behavior database with reference number 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service.

As shown in FIG. 2, a data layer may include several databases, such as a database 218 for storing profile data, including both member profile data as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 218. Similarly, when a representative of an organization initially registers the organization with the social networking service, the representative may be prompted to provide certain information about the organization. This information may be stored, for example, in the database with reference number 218, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with reference number 220.

As members interact with the various applications, services and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database with reference number 222. This logged activity information may then be used as update data by the data maintenance system 216.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the data maintenance system 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

Figure 3:
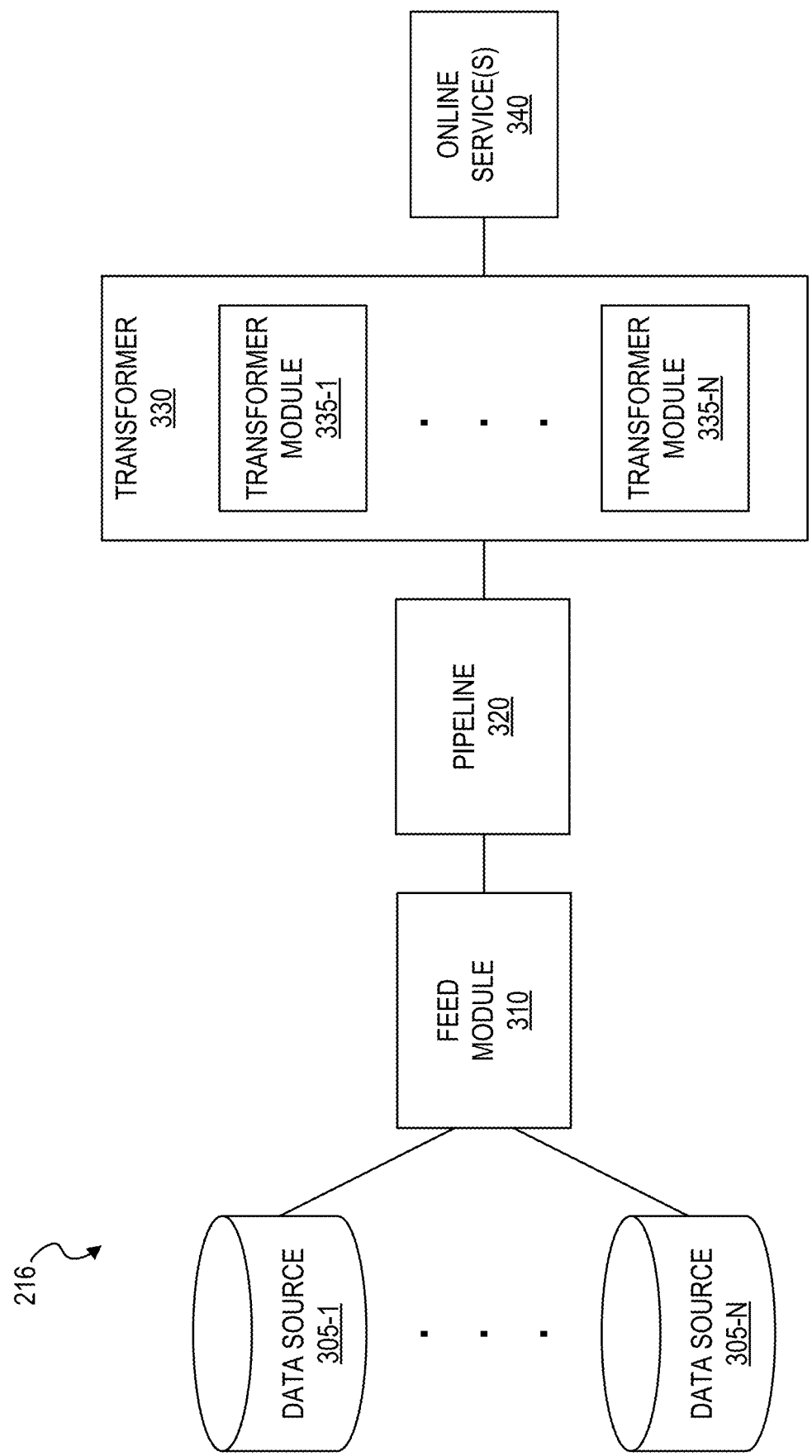
FIG. 3 is a block diagram illustrating components of a data maintenance system, in accordance with an example embodiment.

FIG. 3 is a block diagram illustrating components of the data maintenance system 216, in accordance with an example embodiment. In some embodiments, the data maintenance system 216 comprises any combination of one or more of a feed module 310, a pipeline 320, a transformer 330, and one or more online services 340. The feed module 310, the pipeline 320, the transformer 330, and the one or more online services 340 can reside on a machine having a memory and at least one processor (not shown). In some embodiments, the feed module 310, the pipeline 320, the transformer 330, and the one or more online services 340 can be incorporated into the application server(s) 118 in FIG. 1. However, it is contemplated that other configurations of the feed module 310, the pipeline 320, the transformer 330, and the one or more online services 340 are also within the scope of the present disclosure.

In some example embodiments, the feed module 310 is configured to receive update data from one or more data sources 305 (e.g., data source 305-1, . . . , 305-N). Each data source 305 provides update data to the feed module 310 as part of a data feed. The update data comprises any data that is updated. For example, one data source 305 can be responsible for providing stock prices such that, every time there is a change in the price of a stock, that change in the price or the new price is provided as update data. In another example, another data source 305 can be responsible for providing member status information for members of an online social networking service such that, every time a member's status changes (e.g., a change in profile information, a connection is made with another member, etc.), that change is provided as update data. It is contemplated that a variety of different data sources 305 are within the scope of the present disclosure, and each data source 305 can provide a variety of different types of update data (e.g., a single data source 305 can provide update data for stock prices, news events, and social network member status).

In some example embodiments, the one or more data sources 305 are incorporated into database(s) 126 in FIG. 1 or into any combination of one or more of databases 218, 220, and 222 in FIG. 2. However, it is contemplated that other configurations of the one or more databases) 330 are also within the scope of the present disclosure.

Figure 4:
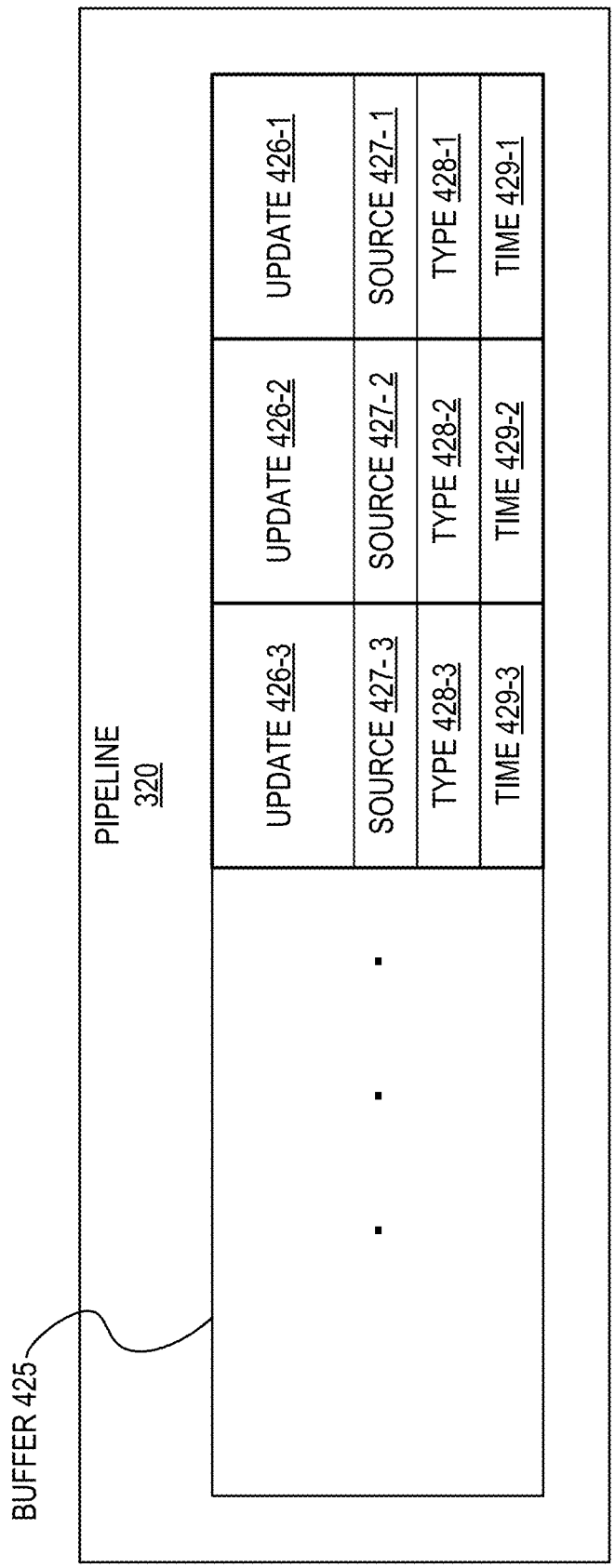
FIG. 4 is a block diagram illustrating a pipeline, in accordance with an example embodiment.

In some example embodiments, the feed module 310 is configured to store the update data in the pipeline 320 in response to, or otherwise based on, receiving the update data from the data source 310. The pipeline 320 can comprise a set of data processing elements connected in series, where the output of one element is the input of the next one. FIG. 4 is a block diagram illustrating the pipeline 320, in accordance with an example embodiment. In some example embodiments, the pipeline 320 comprises a data buffer 425. The data buffer 425 can comprise a first-in first-out (FIFO) buffer. As seen in FIG. 4, the update data can be stored in the data buffer 425. In some example, embodiments, the update data is stored in the data in the order in which it is received by the feed module 310.

In one example, update data 426-1 is provided by the data source 305-1 to the feed module 310, and the feed module 310 stores the update data 426-1 in the data buffer 425 of the pipeline 320. Subsequently, update data 426-2 is provided by the data source 305-2 to the feed module 310, and the feed module 310 stores the update data 426-2 in the data buffer 425 of the pipeline 320 in a location succeeding update data 426-1. Subsequently, update data 426-3 is provided by the data source 305-1 to the feed module 310, and the feed module 310, and the feed module 310 stores the update data 426-3 in the data buffer 425 of the pipeline 320 in a location succeeding update data 426-2.

In some example embodiments, the feed module 310 tags, assigns, or otherwise associates additional data to or with each update data 426. Examples of such additional data include, but are not limited to, source data 427 (e.g., source data 427-1 for update data 426-1, source data 427-2 for update data 426-2, source data 427-3 for update data 426-3, and so on and so forth), type data 428 (e.g., type data 428-1 for update data 426-1, type data 428-2 for update data 426-2, type data 428-3 for update data 426-3, and so on and so forth), and time data 429 (e.g., time data 429-1 for update data 426-1, time data 429-2 for update data 426-2, time data 429-3 for update data 426-3, and so on and so forth).

In some example embodiments, the source data 427 identifies the corresponding data source 305 from which the update data 426 was provided. For example, if update data 426-1 was provided to the feed module 310 by data source 305-1, then the corresponding source data 427-1 of the update data 426-1 would provide an identification or some other indication of the data source 305-1 being the data source 305 from which the update data 426-1 was provided.

In some example embodiments, the type data 428 identifies the corresponding type of data for the update data 426. For example, if update data 426-1 is an update of a stock price, then the corresponding type data 428-1 of the update data 426-1 would provide an identification or some other indication of the update data 426-1 being an update of a stock price.

In some example embodiments, the time data 429 identifies the corresponding time at which the update data 429 was transmitted from the data source 305 to the feed module 310 or the corresponding time at which the update data 429 was received by the feed module 310 from the data source 305. For example, if update data 426-1 is received by the feed module 310 at 11:27 AM on Sep. 2, 2015, then the corresponding time data 429-1 of the update data 426-1 would provide an identification or some other indication of the update data 426-1 as having been received by the feed module 310 at 11:27 AM on Sep. 2, 2015.

In some example embodiments, the pipeline 320 is configured to transmit update data 426 from the data buffer 425 to the data transformer 330. The data transformer 330 is configured to transform (e.g., modify or change the form of) the update data 426. In some example embodiments, the data transformer 330 comprises a plurality of transformer modules 335 (e.g., transformer module 335-1, . . . , transformer module 335-N). Each transformer module 335 can be configured to transform only update data from a specific set of one or more data sources 305. For example, transformer module 335-1 can be configured to transform only update data from data source 305-1, while transformer module 335-2 can be configured to transform only update data from data sources 305-2 and 305-3. Additionally or alternatively, each transformer module 335 can be configured to transform only update data of a specific set of one or more data types. For example, transformer module 335-1 can be configured to transform only update data of stock prices, while transformer module 335-2 can be configured to transform only update data of social network member profile information. Other configurations of the transformer modules 335 are also within the scope of the present disclosure.

In some example embodiments, the transformer 330, such as via one of its transformer modules 335, is configured to transmit the transformed update data 426 to one or more of the one or more online services 340 for consumption and use by the one or more online services 340. It is contemplated that the one or more online services 340 can use the transformed update data 426 in a variety of different ways. For example, some online services 340 can use the transformed update data 426 to generate recommendations of content for users, while other online services 340 can use the transformed update data 426 to generate alerts of events for users. In some example embodiments, at least one of the one or more online services 340 comprises a social networking service. However, it is contemplated that other configurations of the one or more online services 340 are also within the scope of the present disclosure.

In some example embodiments, the pipeline 320 is configured to retain the update data 426, along with its corresponding additional data (e.g., source data 427, type data 428, and time data 429), in the data buffer 425 even though the update data 426 has been transmitted from the data buffer 425 to the data transformer 330. For example, referring back to the example shown in FIG. 4, update data 426-1 can be transmitted to the data transformer 330. However, update data 426-1, along with its corresponding additional data (e.g., source data 427-1, type data 428-1, and time data 429-1) can remain stored in the data buffer 425 even after the transmission of the update data 426 to the data transformer 330.

By retaining the update data 426 in the data buffer 425 after the update data 426 has been transmitted to the data transformer 330, the systems and methods of the present disclosure enable the update data 426 to be retransmitted from the data buffer 425 to the data transformer 330, thus providing a technical solution to the technical problem of the one or more online services 340 missing accurate and current update data due to a problem associated with the initial transmission of the update data (e.g., the update data was sent by the data buffer 425, but never received by the data transformer 330) or a problem associated with the data transformer (e.g., a bug in the data transformer 330). In some example embodiments, the data retention policy for the data buffer 425 is much longer than the data retention policy for the feed module 310. For example, the data feed module 310 may retain the update data 426 for only one minute, while the data buffer 425 may retain the update data 426 for two months with a majority of those two months occurring even after an initial transmission of the update data 426 from the data buffer 425 to the data transformer 330. In some example embodiments, the pipeline 320 also retains the order of the different update data 426 (e.g., 426-1, 426-2, 426-3, etc.) during the data retention period after the initial transmission of the update data 426 to the data transformer 330.

In some example embodiments, the data maintenance system 216 is configured to receive a request for retransmission of the update data 426 from the data buffer 425 to the data transformer 330, and to retransmit the update data 426 from the data buffer 425 to the data transformer 330 in response to the request for retransmission. For example, the pipeline 320 can receive a request for retransmission of the update data 426 from the data buffer 425 to the data transformer 330, and then retransmit the update data 426 from the data buffer 425 to the data transformer 330 in response to the request for retransmission.

In some example embodiments, the request for retransmission can be generated automatically, without human intervention, in response to a detection of a problem associated with the initial transmission of the update data (e.g., the update data was sent by the data buffer 425, but never received by the data transformer 330) or a problem associated with the data transformer (e.g., a bug in the data transformer 330). The problem can be detected by the pipe 320, the transformer 330, and/or the one or more online services 340. The problem can be detected based on a user submitting an indication of the problem, such as the data maintenance system 216 detecting a user-submitted ticket received via an issue tracking system. Furthermore, the request for retransmission can be generated by the pipe 320, the transformer 330, and/or the one or more online services 340. It is contemplated that other components can perform the problem detection and request generation operations.

In some other example embodiments, the request for retransmission can be generated with the involvement of human intervention. For example, a problem associated with the initial transmission of the update data (e.g., the update data was sent by the data buffer 425, but never received by the data transformer 330) or a problem associated with the data transformer (e.g., a bug in the data transformer 330) can be detected, as described above. The data maintenance system 216 (e.g., the pipe 320, the transformer 330, and/or the one or more online services 340) can generate a notification of the problem based on the detecting of the problem, and then cause the generated notification of the problem to be displayed to a user on a computing device.

The data maintenance system 216 (e.g., the pipe 320, the transformer 330, and/or the one or more online services 340) can then receive, from the user on the computing device, an indication to request retransmission of the update data, and then generate the request for retransmission of the update data based on the received indication to request retransmission of the update data.

In some example embodiments, the indication to request retransmission of the update data is received via at least one selectable user interface elements displayed to the user on the computing device in association with the generated notification. In some example embodiments, the indication comprises at least one parameter from a group of parameters consisting of a time indication, a data source indication, and a data type indication, and retransmitting the update data comprises identifying the update data in the data buffer based on the at least one parameter.

Figure 5:
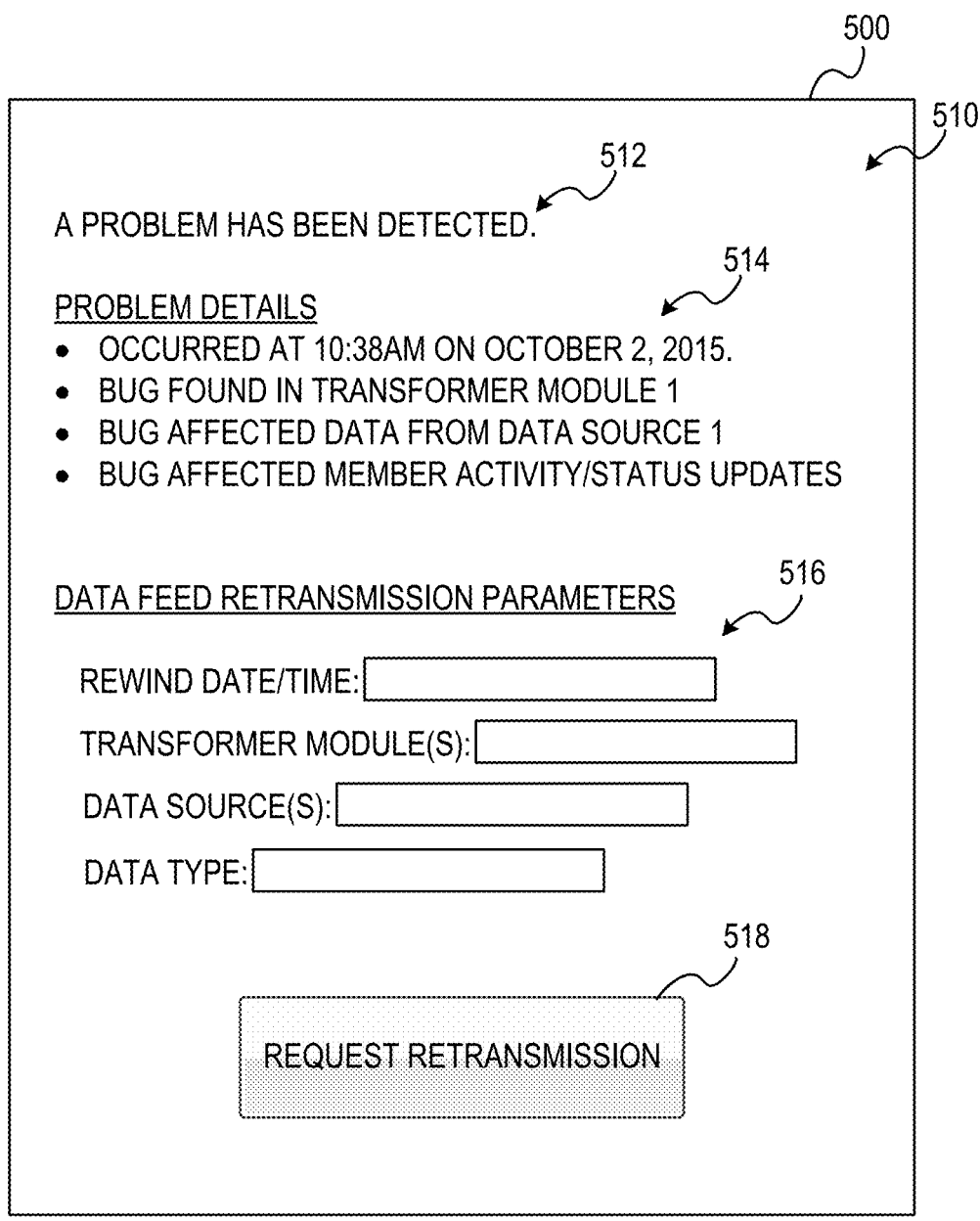
FIG. 5 is a block diagram illustrating a notification of a problem being displayed via a user interface on a computing device, in accordance with an example embodiment.

FIG. 5 is a block diagram illustrating a notification 510 of a problem being displayed via a user interface 500 on a computing device, in accordance with an example embodiment. The notification 510 can comprise an identification 512 or some other indication of the problem (e.g., "A problem has been detected"). In some example embodiments, the notification 510 comprises one or more details 514 of the problem. Such details 514 can include, but are not limited to, an occurrence time of the problem (e.g., "Occurred at 10:38 AM on Oct. 2, 2015"), an identification of the problem and in which component it occurred (e.g., "Bug found in transformer module 1"), an identification of the source of the data that has been affected by the problem (e.g., "Bug affected data from data source 1"), and an identification of the type of data that has been affected by the problem (e.g., "Bug affected member activity/status updates").

In some example embodiments, the notification 510 also comprises one or more user interface elements 516 (e.g., user input fields, drop-down menus, buttons, etc.) corresponding to one or more data feed retransmission parameters, which can be used to identify what data to retransmit. Examples of retransmission parameters can include, but are not limited to, an identification of a date and/or time indicating how far back in the data buffer 425 to start the retransmission of update data 426 from the data buffer 425 (e.g., "Rewind Date/Time"), an identification of a component at which the problem occurred (e.g., "Transformer Module"), an identification of the data source(s) 305 that provided the updated data that is to be retransmitted (e.g., "Data Source(s)"), and an identification of the type of data for the update data 426 that is to be retransmitted (e.g., "Data Type"). Other retransmission parameters are also within the scope of the present disclosure. A selectable user interface element 518 (e.g., a button) can be provided to enable the user to submit a request for retransmission comprising the retransmission parameter(s). In some example embodiments, the request for retransmission is generated in response to a user selection of the selectable user interface element 518.

In some example embodiments, retransmitting the update data 426 from the data buffer 425 to the data transformer 330 comprises identifying one or more update data 426 in the data buffer 425 using the one or more retransmission parameters. For example, if the request for retransmission comprises a time indication of 10:38 AM on Oct. 2, 2015 as a retransmission parameter, then the data maintenance system 216 (e.g., the pipeline 320) can search or scan the data buffer 425 to find an update data 426 that corresponds to that time indication. In some example embodiments, the data maintenance system 216 can identify an update data 426 that has matching time data 429 or the first update data 426 with time data 429 after the time indication. In some example embodiments, the data maintenance system 216 can then retransmit the single identified update data 426. In some other example embodiments, the data maintenance system 216 can retransmit the identified update data 426 and all of the update data 426 in the data buffer 425 having time data subsequent to the time indication. For example, referring to FIG. 4, if the data maintenance system 216 identifies update data 426-2 based on a time indication in the request for retransmission, the data maintenance system 216 can begin retransmitting all of the update data 426 in the data buffer 425 from update data 426-2 to the oldest update data 426 in the data buffer 425, which in the example in FIG. 4 would be update data 426-1. Other retransmission filters can be used to restrict what update data 426 in the data buffer 425 is retransmitted. The additional data of the update data 426, such as the source data 427, the type data 428, and the time data 429, can be compared to the retransmission parameter(s) to determine what update data 426 to retransmit.

Figure 6:
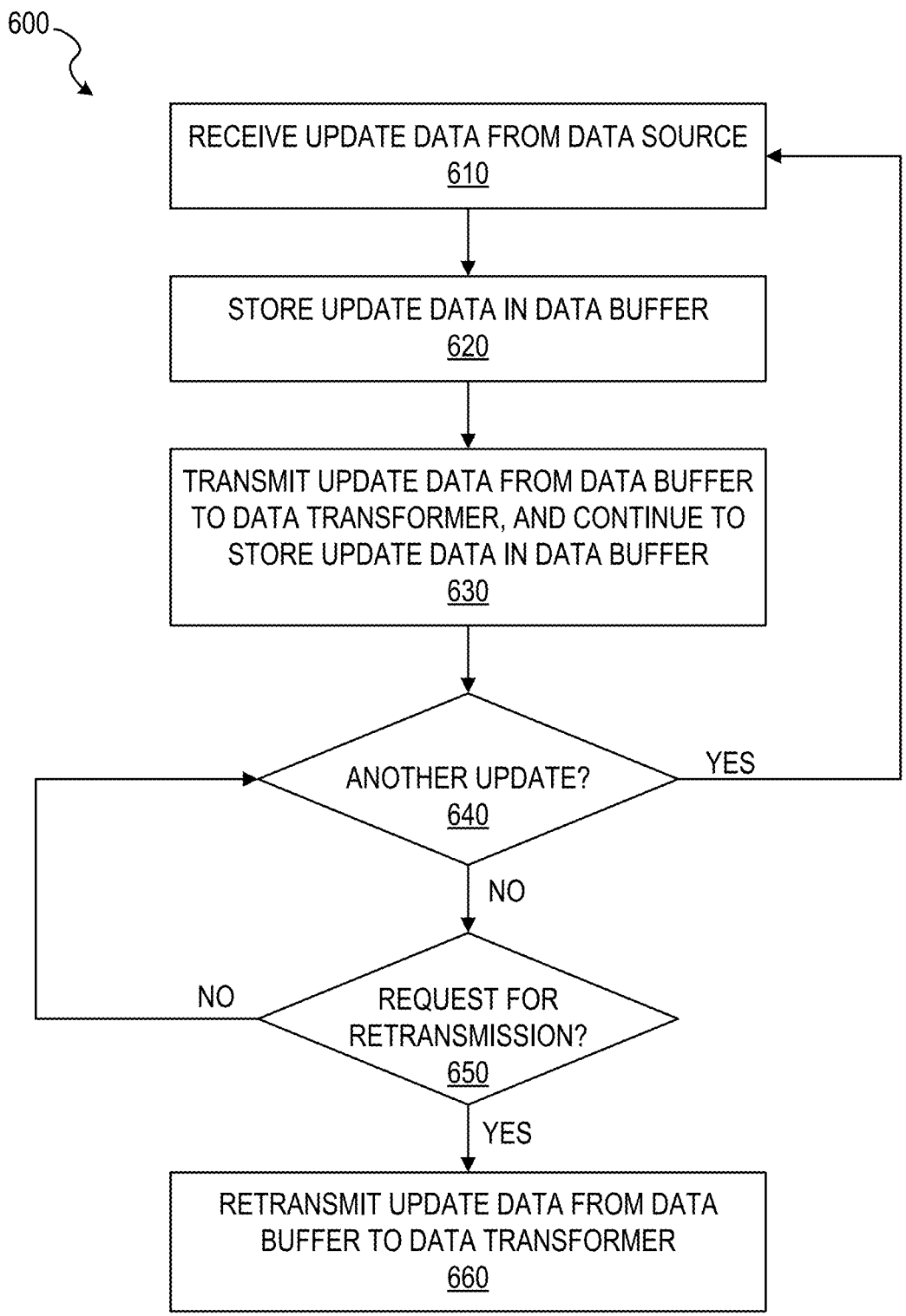
FIG. 6 is a flowchart illustrating a method of data maintenance, in accordance with an example embodiment.

FIG. 6 is a flowchart illustrating a method 600 of data maintenance, in accordance with an example embodiment. Method 600 can be performed by processing logic that can comprise hardware (e.g., circuitry, dedicated logic, programmable logic, microcode, etc.), software (e.g., instructions run on a processing device), or a combination thereof. In one implementation, the method 600 is performed by the data maintenance system 216 of FIGS. 2-3, or any combination of one or more of its components, as described above.

At operation 610, update data is received (e.g., by the feed module 310) from a data source. The update data is part of a data feed from the data source. At operation 620, in response to receiving the update data from the data source, the update data is stored in a data buffer. In some example embodiments, at least one of time data, source data, and type data is stored in the data buffer in association with the update data, with the time data identifying a time at which the update data was received, the source data identifying the data source, and the type data identifying a type of the update data.

At operation 630, the update data is transmitted from the data buffer to a data transformer. The data transformer is configured to transform the update data and to transmit the transformed update data to an online service. The update data continues to be stored in the data buffer subsequent to the transmitting of the update data to the data transformer. At operation 640, it is determined whether there is additional update data to be received from a data source. If it is determined that there is additional update data to be received from a data source, then the method 600 returns to operation 610, where additional update data is received. If it is determined that there is not additional update data to be received from a data source, then the method 600 proceeds to operation 650, where it is determined if a request for retransmission of update data has been received. If it is determined that a request for retransmission has not been received, then the method returns to operation 640. If it is determined that a request for retransmission has been received, then the method 600 proceeds to operation 660, where the update data is retransmitted from the data buffer to the data transformer. In some example embodiments, the request for retransmission comprises at least one parameter from a group of parameters consisting of a time indication, a data source indication, and a data type indication, and the at least one parameter is used to identify the update data in the data buffer to retransmit.

It is contemplated that any of the other features described within the present disclosure can be incorporated into method 600.

Figure 7:
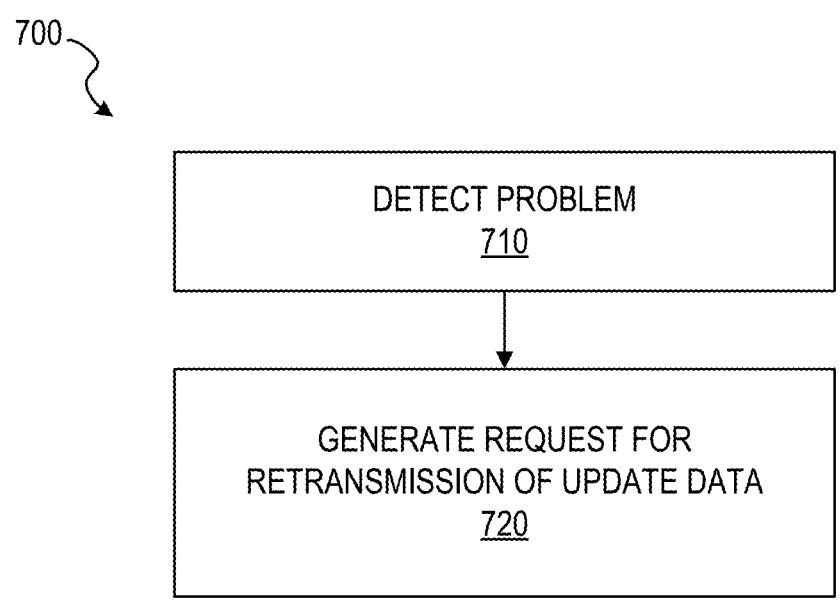
FIG. 7 is a flowchart illustrating a method of generating a request for retransmission of update data, in accordance with an example embodiment.

FIG. 7 is a flowchart illustrating a method 700 of generating a request for retransmission of update data, in accordance with an example embodiment. Method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the data maintenance system 216 of FIGS. 2-3, or any combination of one or more of its components, as described above.

At operation 710, a problem is detected. The problem can comprise a problem associated with the initial transmission of the update data or a problem associated with the data transformer. At operation 720, a request for retransmission of the update data is generated and transmitted to the data buffer (or to another appropriate component of the data maintenance system 216 configured to carry out the request) based on the detecting of the problem.

It is contemplated that any of the other features described within the present disclosure can be incorporated into method 700.

Figure 8:
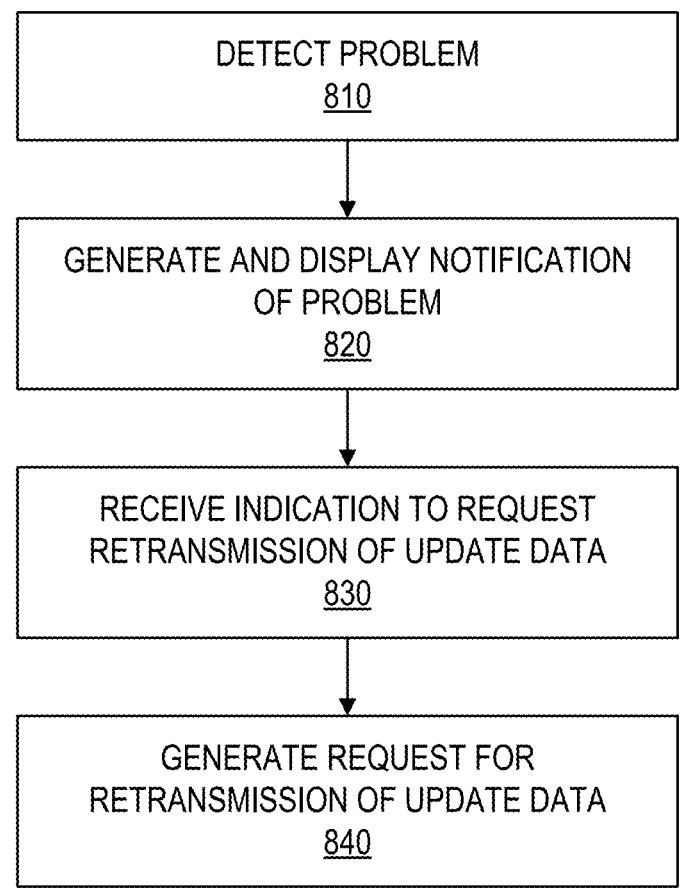
FIG. 8 is a flowchart illustrating another method of generating a request for retransmission of update data, in accordance with an example embodiment.

FIG. 8 is a flowchart illustrating another method 800 of generating a request for retransmission of update data, in accordance with an example embodiment. Method 800 can be performed by processing logic that can comprise hardware (e.g., circuitry, dedicated logic, programmable logic, microcode, etc.), software (e.g., instructions run on a processing device), or a combination thereof. In one implementation, the method 800 is performed by the data maintenance system 216 of FIGS. 2-3, or any combination of one or more of its components, as described above.

At operation 810, a problem is detected. The problem can comprise a problem associated with the initial transmission of the update data or a problem associated with the data transformer. At operation 820, a notification of the problem is generated based on the detecting of the problem, and the generated notification is caused to be displayed to a user on a computing device. At operation 830, an indication to request retransmission of the update data is received from the user on the computing device. In some example embodiments, the indication to request retransmission of the update data is received via at least one selectable user interface elements displayed to the user on the computing device in association with the generated notification. In some example embodiments, the indication comprises at least one parameter from a group of parameters consisting of a time indication, a data source indication, and a data type indication, and retransmitting the update data comprises identifying the update data in the data buffer based on the at least one parameter. At operation 840, the request for retransmission of the update data is generated and transmitted to the data buffer (or to another appropriate component of the data maintenance system 216 configured to carry out the request) based on the received indication to request retransmission of the update data. In some example embodiments, the at least one parameter is used to identify the update data in the data buffer to retransmit.

It is contemplated that any of the other features described within the present disclosure can be incorporated into method 800.

Example Mobile Device

Figure 9:
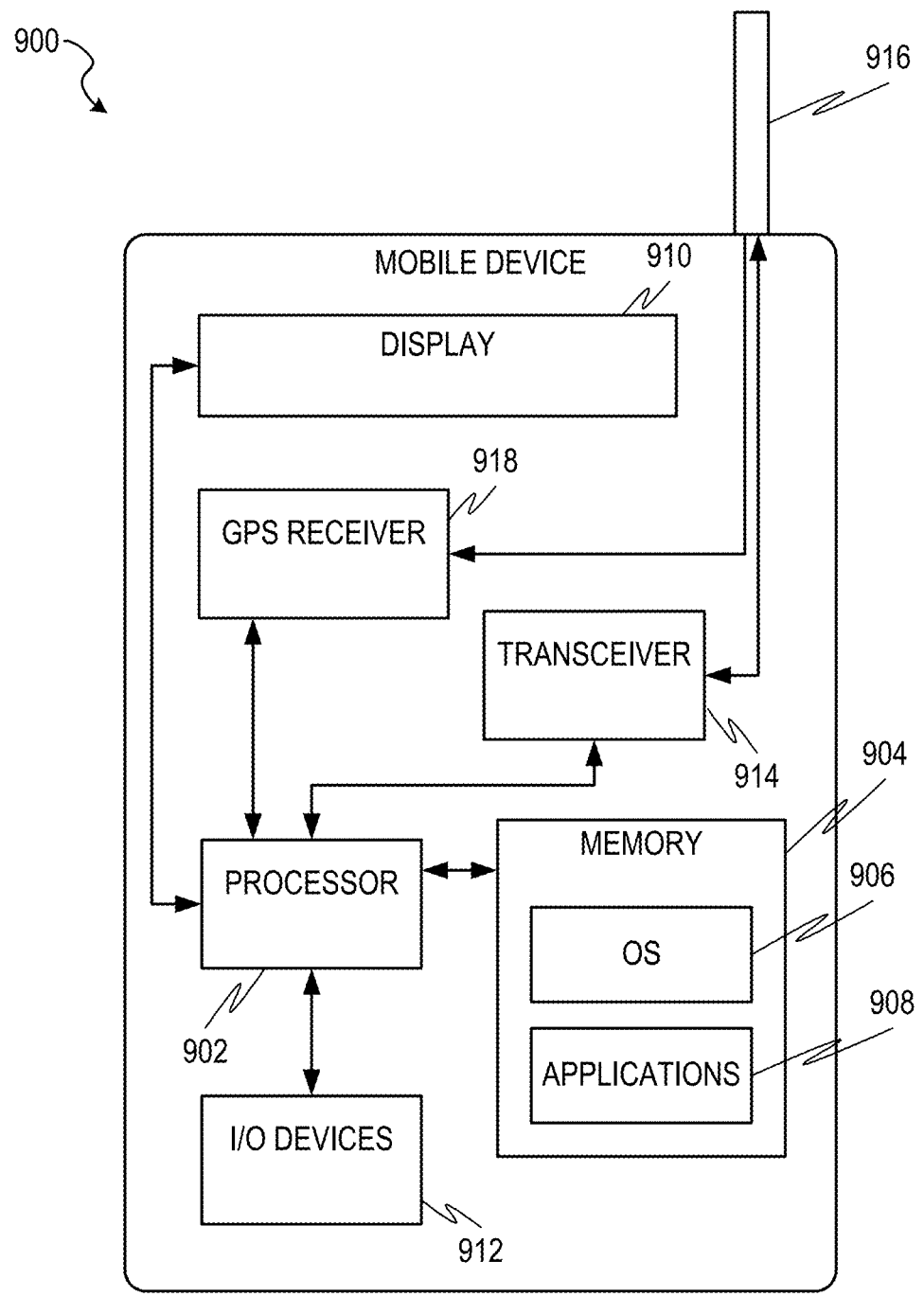
FIG. 9 is a block diagram illustrating a mobile device, in accordance with some example embodiments.

FIG. 9 is a block diagram illustrating a mobile device 900, according to an example embodiment. The mobile device 900 can include a processor 902. The processor 902 can be any of a variety of different types of commercially available processors suitable for mobile devices 900 (for example, an XScale architecture microprocessor, a Microprocessor without Interlocked Pipeline Stages (MIPS) architecture processor, or another type of processor). A memory 904, such as a random access memory (RAM), a Flash memory, or other type of memory, is typically accessible to the processor 902. The memory 904 can be adapted to store an operating system (OS) 906, as well as application programs 908, such as a mobile location enabled application that can provide location-based services (LBSs) to a user. The processor 902 can be coupled, either directly or via appropriate intermediary hardware, to a display 910 and to one or more input/output (I/O) devices 912, such as a keypad, a touch panel sensor, a microphone, and the like. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 10:
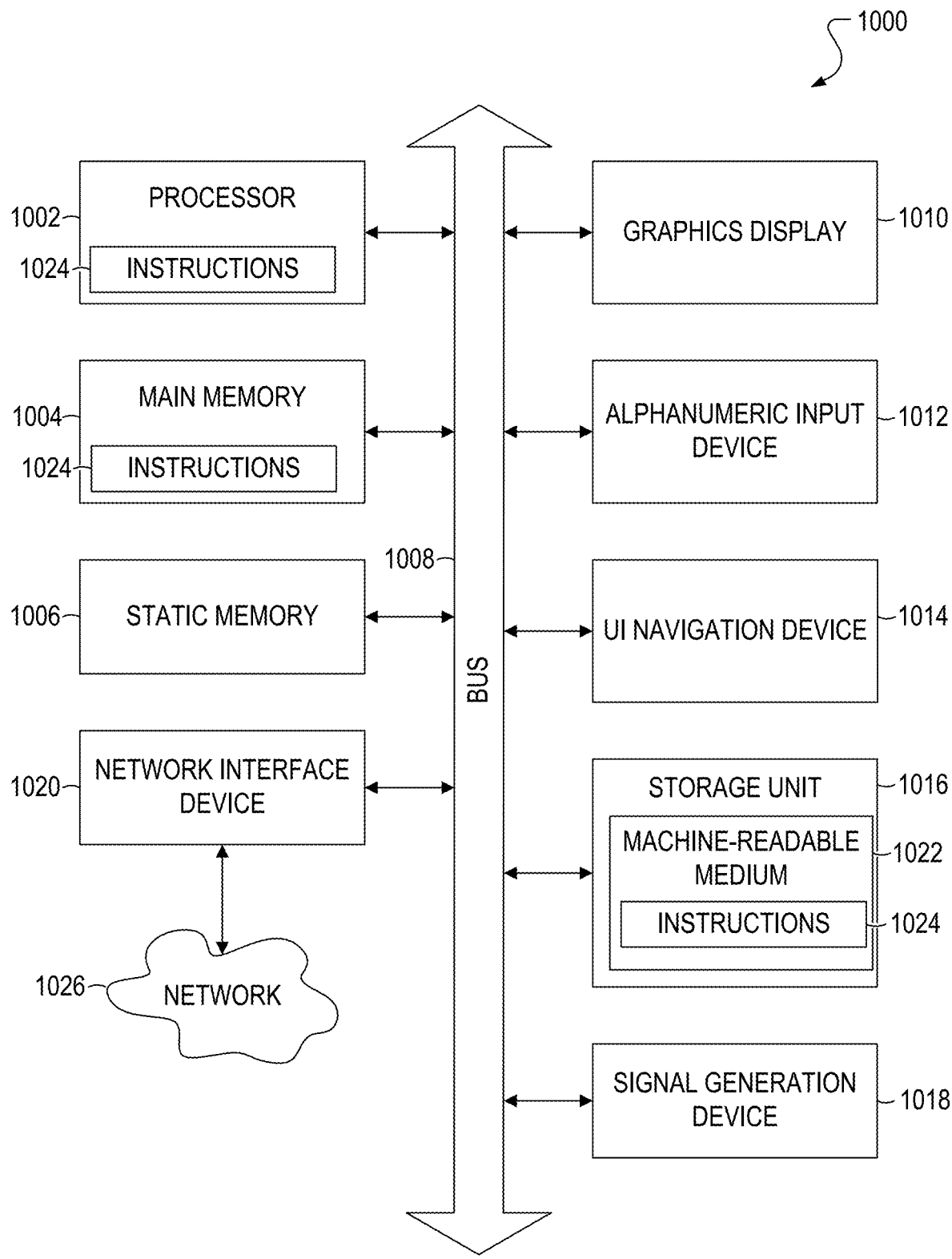
FIG. 10 is a block diagram of an example computer system on which methodologies described herein may be executed, in accordance with an example embodiment.

FIG. 10 is a block diagram of an example computer system 1000 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   receiving update data from a data source, the update data being part of a data feed from the data source;
   in response to receiving the update data from the data source, storing, by at least one processor, the update data in a data buffer;
   transmitting the update data from the data buffer to a data transformer, the data transformer being configured to transform the update data and to transmit the transformed update data to an online service, the update data being continued to be stored in the data buffer subsequent to the transmitting of the update data to the data transformer;
   detecting a problem associated with the data transformer;
   generating a notification of the problem based on the detecting of the problem;
   causing the generated notification of the problem to be displayed to a user on a computing device;
   receiving, from the user on the computing device, an indication to request retransmission of the update data;
   generating a request for retransmission of the update data based on the received indication to request retransmission of the update data; and
   in response to the request for retransmission, retransmitting the update data from the data buffer to the data transformer.

2. The method of claim 1, wherein the indication to request retransmission of the update data is received via at least one selectable user interface elements displayed to the user on the computing device in association with the generated notification.

3. The method of claim 2, wherein the indication comprises at least one parameter from a group of parameters consisting of a time indication, a data source indication, and a data type indication, and retransmitting the update data comprises identifying the update data in the data buffer based on the at least one parameter.

4. The method of claim 1, further comprising storing time data in the data buffer in association with the update data, the time data identifying a time at which the update data was received.

5. The method of claim 4, wherein the request for retransmission comprises a time indication, and retransmitting the update data comprises identifying the update data in the data buffer using the time indication of the request for retransmission.

6. The method of claim 1, further comprising storing at least one of source data and type data in the data buffer in association with the update data, the source data identifying the data source, and the type data identifying a type of the update data.

7. The method of claim 1, wherein the data buffer comprises a first-in first-out (FIFO) buffer.

8. The method of claim 1, wherein the online service comprises a social networking service.

9. A system comprising:
at least one processor; and
a non-transitory machine-readable medium embodying a set of instructions that, when executed by the at least one processor, cause the at least one processor to perform operations, the operations comprising:
receiving update data from a data source, the update data being part of a data feed from the data source;
in response to receiving the update data from the data source, storing the update data in a data buffer;
transmitting the update data from the data buffer to a data transformer, the data transformer being configured to transform the update data and to transmit the transformed update data to an online service, the update data being continued to be stored in the data buffer subsequent to the transmitting of the update data to the data transformer;
detecting a problem associated with the data transformer;
generating a notification of the problem based on the detecting of the problem;
causing the generated notification of the problem to be displayed to a user on a computing device;
receiving, from the user on the computing device, an indication to request retransmission of the update data;
generating a request for retransmission of the update data based on the received indication to request retransmission of the update data; and
in response to the request for retransmission, retransmitting the update data from the data buffer to the data transformer.

10. The system of claim 9, wherein the indication to request retransmission of the update data is received via at least one selectable user interface elements displayed to the user on the computing device in association with the generated notification.

11. The system of claim 10, wherein the indication comprises at least one parameter from a group of parameters consisting of a time indication, a data source indication, and a data type indication, and retransmitting the update data comprises identifying the update data in the data buffer based on the at least one parameter.

12. The system of claim 9, wherein the operations further comprise storing time data in the data buffer in association with the update data, the time data identifying a time at which the update data was received.

13. The system of claim 12, wherein the request for retransmission comprises a time indication, and retransmitting the update data comprises identifying the update data in the data buffer using the time indication of the request for retransmission.

14. A non-transitory machine-readable medium embodying a set of instructions that, when executed by a processor, cause the processor to perform operations, the operations comprising:
receiving update data from a data source, the update data being part of a data feed from the data source;
in response to receiving the update data from the data source, storing the update data in a data buffer;
transmitting the update data from the data buffer to a data transformer, the data transformer being configured to transform the update data and to transmit the transformed update data to an online service, the update data being continued to be stored in the data buffer subsequent to the transmitting of the update data to the data transformer;
receiving a request for retransmission of the update data from the data buffer to the data transformer;
in response to the request for retransmission, retransmitting the update data from the data buffer to the data transformer;
detecting a problem associated with the data transformer;
generating a notification of the problem based on the detecting of the problem;
causing the generated notification of the problem to be displayed to a user on a computing device;
receiving, from the user on the computing device, an indication to request retransmission of the update data;
generating a request for retransmission of the update data based on the received indication to request retransmission of the update data; and
in response to the request for retransmission, retransmitting the update data from the data buffer to the data transformer.

\* \* \* \* \*